United States Patent
Dobson, Jr. et al.

(10) Patent No.: US 10,563,111 B2
(45) Date of Patent: Feb. 18, 2020

(54) SOLUBILIZED POLYMER CONCENTRATES, METHODS OF PREPARATION THEREOF, AND WELL DRILLING AND SERVICING FLUIDS CONTAINING THE SAME

(71) Applicant: TUCC Technology, LLC, Houston, TX (US)

(72) Inventors: James W. Dobson, Jr., Houston, TX (US); Kim O. Tresco, Houston, TX (US)

(73) Assignee: TUCC Technology, LLC, Houston, TX (US)

( * ) Notice: Subject to any disclaimer, the term of this patent is extended or adjusted under 35 U.S.C. 154(b) by 0 days.

(21) Appl. No.: 15/445,366

(22) Filed: Feb. 28, 2017

(65) Prior Publication Data
US 2017/0166796 A1    Jun. 15, 2017

Related U.S. Application Data

(63) Continuation of application No. 13/971,697, filed on Aug. 20, 2013, now abandoned.

(60) Provisional application No. 61/691,039, filed on Aug. 20, 2012.

(51) Int. Cl.
| | |
|---|---|
| *C09K 8/035* | (2006.01) |
| *C09K 8/34* | (2006.01) |
| *C09K 8/487* | (2006.01) |
| *E21B 33/138* | (2006.01) |
| *C09K 8/52* | (2006.01) |
| *C09K 8/64* | (2006.01) |
| *E21B 21/00* | (2006.01) |

(52) U.S. Cl.
CPC ............... *C09K 8/34* (2013.01); *C09K 8/487* (2013.01); *C09K 8/52* (2013.01); *C09K 8/64* (2013.01); *E21B 21/003* (2013.01); *E21B 33/138* (2013.01)

(58) Field of Classification Search
CPC . C09K 8/035; C09K 8/50; C09K 8/62; C09K 8/80; C09K 2208/10; C09K 5/20; C09K 8/02; C09K 8/32; C09K 8/38; C09K 8/473; C09K 8/536; C09K 8/5755; C09K 8/58; C09K 8/584; C09K 8/605; C09K 8/82; E21B 23/06; E21B 43/14; E21B 34/06; E21B 43/26; E21B 47/06; E21B 33/12; E21B 43/267; E21B 41/00; E21B 43/16; E21B 47/122; E21B 2034/007; E21B 34/12; E21B 43/168; E21B 23/01; E21B 33/1285; E21B 43/2406; E21B 43/25; E21B 47/18; E21B 4/02; E21B 10/322; E21B 10/42; E21B 10/43; E21B 10/5735; E21B 15/02; E21B 17/00; E21B 17/04; E21B 17/1078; E21B 19/10; E21B 19/14; E21B 2021/006
See application file for complete search history.

(56) References Cited

U.S. PATENT DOCUMENTS

| | | | |
|---|---|---|---|
| 2,697,071 A | 12/1954 | Kennedy et al. | |
| 2,743,233 A | 4/1956 | Fisher | |
| 4,421,655 A * | 12/1983 | Cowan | C09K 8/32 507/107 |
| 4,531,594 A * | 7/1985 | Cowan | C09K 8/035 175/72 |
| 4,740,319 A | 4/1988 | Patel et al. | |
| 5,128,427 A | 7/1992 | Chen | |
| 5,333,698 A | 8/1994 | Van Slyke | |
| 5,883,054 A | 3/1999 | Hernandez et al. | |
| 6,395,686 B2 | 5/2002 | Crawford | |
| 6,518,224 B2 | 2/2003 | Wood | |
| 6,730,637 B1 * | 5/2004 | Stewart | C09K 8/32 175/72 |
| 7,897,545 B2 | 3/2011 | Wilson et al. | |
| 8,343,895 B2 | 1/2013 | Van de Peer et al. | |
| 2002/0010100 A1 * | 1/2002 | Wood | C09K 8/035 507/100 |
| 2005/0170973 A1 * | 8/2005 | Verret | C09K 8/32 507/107 |
| 2006/0148654 A1 * | 7/2006 | Dobson, Jr. | C09K 8/32 507/110 |
| 2008/0017376 A1 | 1/2008 | Badalamenti et al. | |
| 2008/0171670 A1 * | 7/2008 | Cowan | C09K 8/035 507/206 |
| 2011/0009298 A1 * | 1/2011 | Dobson, Jr. | C09K 8/14 507/125 |
| 2012/0103613 A1 | 5/2012 | Gersbach et al. | |

FOREIGN PATENT DOCUMENTS

| | | |
|---|---|---|
| EP | 1358233 | 12/2008 |
| WO | 03/089541 | 10/2003 |

OTHER PUBLICATIONS https://en.wikipedia.org/w/index.php?title=Crumb_rubber&printable=yes downloaded on Jun. 6, 2016.*

(Continued)

*Primary Examiner* — Kumar R Bhushan
(74) *Attorney, Agent, or Firm* — Lewis & Reese, PLLC

(57) ABSTRACT

The invention provides concentrates for reducing the fluid loss on an oil base well drilling or servicing fluid, the concentrates comprising an oleagineous liquid and (1) a polymer which is solublized in the oleagineous liquid, or (2) a polymer which is solublized in the oleaginous liquid together with an organophilic polyphenolic material which is solublized and/or dispersed in the oleagineous liquid. The method of preparing the concentrate and the method of reducing the fluid loss of an oil base well drilling or servicing fluid utilizing the concentrates is also disclosed. The preferred oil soluble polymer is a styrene-butadiene rubber crumb. The preferred oleagineous liquid is an aromatic-free hydrogenated oil essentially containing only saturated hydrocarbons. The preferred polyphenolic material is a source of humic acid, such as mined lignite.

5 Claims, No Drawings

(56) References Cited

OTHER PUBLICATIONS https://en.wikipedia.org/wiki/ Crumb_rubber downloaded on Apr. 5, 2019.*
International Search Report for Corresponding International Patent Application No. PCT/US2013/055882, dated Dec. 2, 2013.
Written Opinion of Corresponding International Patent Application No. PCT/US2013/055882, dated Dec. 2, 2013.

* cited by examiner

SOLUBILIZED POLYMER CONCENTRATES, METHODS OF PREPARATION THEREOF, AND WELL DRILLING AND SERVICING FLUIDS CONTAINING THE SAME

CROSS-REFERENCE TO RELATED APPLICATIONS

This application is a continuation of U.S. Non-Provisional application Ser. No. 13/971,697, filed Aug. 20, 2013, which is a non-provisional of U.S. Provisional Patent Application Ser. Nos. 61/691,039, filed Aug. 20, 2012. Priority is claimed to these applications, and they are incorporated herein by reference in their entireties.

FIELD OF THE INVENTION

The inventions disclosed and taught herein relate generally to oil-based well drilling and servicing fluids. More particularly, the inventions relate to all-oil and invert oil emulsion well drilling, servicing and treating fluids containing an oil-soluble polymeric fluid loss control additive solubilized therein.

BACKGROUND

This invention relates to oil base well drilling and servicing fluids. In particular, the invention relates to "all-oil" and "invert oil" emulsion well drilling and servicing fluids containing an oil-soluble polymeric fluid loss control additive solubilized therein.

As is well known in the art, invert emulsion oil based well drilling and servicing fluids, generally called "muds", are water-in-oil emulsions that typically contain an organophilic clay viscosifier/suspension additive, and a weighting agent. The water phase is usually a solution of a salt, such as calcium chloride or sodium chloride, whose concentration is normally adjusted such that the aqueous activity of the fluid is equal to or less than the aqueous activity of the subterranean formations contacted by the fluids. This minimizes transfer of water-to-water-sensitive formations and maintains a stable wellbore.

The invert emulsion is usually stabilized with a "primary emulsifier", often a fatty acid or salt thereof, while the weighting material and the solids the fluid acquires during use are made oil-wet and dispersed in the fluid with a "secondary emulsifier", typically a strong wetting agent such as a polyamide, amido-amine (partial amide of a polyamine), and the like.

Regardless of whether it is an all-oil, or an invert fluid, drilling fluids, or 'drilling muds' as they are sometimes called, are slurries used in the drilling of wells into the earth for the purpose of recovering hydrocarbons and other fluid materials. Drilling fluids have a number of functions, the most important of which include lubricating the drilling tool and drill pipe which carries the drilling tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and pumping of the drilling fluid.

For a drilling fluid to perform these functions and allow drilling to progress, the drilling fluid must stay in the borehole during the drilling operation. Frequently, undesirable formation conditions are encountered in which substantial amounts, or in some cases, practically all of the drilling fluid may be lost to the formation. Drilling fluid can leave the borehole through large or small fissures or fractures in the formation or through a highly porous rock matrix surrounding the borehole.

Most subterranean wells are drilled with the intent of forming a filter cake of varying thickness on the sides of the borehole. The primary purpose of the filter cake is to reduce the large losses of drilling fluid to the surrounding formation. Unfortunately, formation conditions are frequently encountered which may result in unacceptable losses of drilling fluid to the surrounding formation despite the type of drilling fluid employed and filter cake created.

Well drilling and servicing fluids typically contain an additive to control the loss of fluid to the formation being drilled or serviced. A variety of different substances have been used and are pumped down well bores in an attempt to reduce the large losses of drilling fluid to fractures and the like in the surrounding formations. Typical fluid loss control additives for use with oil base fluids are gilsonite, asphalt, oxidized asphalt, cellulose-based materials and various polymers, as well as almond, walnut, and other nut hulls. These fluid-loss control agents are added to the drilling or servicing fluid in an attempt to reduce the unacceptable high losses of drilling or servicing fluid to fractures and/or porous structures in the surround formation.

A number of issued patents over the years have described various polymeric compositions as fluid loss control additives in oil base muds. For example, U.S. Pat. No. 2,697,071 to Kennedy, et al. describes the use of rubber latex to regulate the viscosity and fluid loss of oil base muds.

U.S. Pat. No. 2,743,233 to Fisher describes drilling muds, and improved methods of drilling wells in the earth. Preferred embodiments of the invention reportedly relate to oil-base drilling muds having low fluid loss and increased viscosities. Another aspect of the disclosed invention pertains to oil-water emulsions used as drilling muds.

U.S. Pat. No. 4,740,319 (Patel, et al.) discloses oil base muds containing a "gelling composition" comprising a copolymer which includes 2 primary components: (1) latex type material preferably a styrene-butadiene copolymer and (2) one or more functional monomers selected from the group consisting of amides, amines, sulfonates, monocarboxylic acids, dicarboxylic acids and combinations thereof.

In U.S. Pat. No. 5,333,698, a wellbore fluid (e.g., a drilling, completion, packer, or fracturing fluid) is described that includes (a) at least one additive selected from the group consisting of emulsifiers, wetting agents, viscosifiers, weighting agents, fluid loss control agents, including polymeric fluid loss control agents, proppants for use in hydraulically fracturing subterranean formations, and particulate agents for use in forming a gravel pack; and, (b) a non-toxic white mineral oil having (i) an API gravity at 15.6° C. (60° F.) greater than 35, (ii) a content of compounds containing 14 or more carbon atoms of at least about 95 weight percent, and (iii) a pour point of at least about −30° C. (−22° F.).

U.S. Pat. No. 5,883,054 to Hernandez, et al., describes thermally stable, oil base drilling fluid systems including drilling fluid and an additive, wherein the additive includes styrene-butadiene copolymers having an average molecular weight greater than about 500,000 g/mol, and wherein the drilling fluid system exhibits fluid loss control under high temperature and high pressure conditions. According to the disclosure, the copolymers were dissolved in the base oil for 16 hours before the remainder of the additives were added.

U.S. Pat. No. 6,730,637 to Stewart, et al. describes a low toxicity drilling mud oil. In some of the described embodiments, the fluid loss characteristic of the drilling mud oil as used in a borehole can be reduced to less than 0.2 ml/30 minutes by adding about 0.05% to about 2.0% by weight of a butadiene-styrene-butadiene (BSB) block copolymer having about 20% by weight or more styrene.

The inventions disclosed and taught herein are directed to polymeric compositions and methods for the use of such compositions for reducing the fluid loss of invert oil emulsion and all oil well drilling and servicing fluids in which oil is the continuous phase.

BRIEF SUMMARY OF THE INVENTION

The objects described above and other advantages and features of the invention are incorporated in the application as set forth herein, and the associated examples and drawings, related to systems for utilizing an oil-soluble polymer in decreasing the fluid loss of oil base muds, particularly such muds that contain little or no aromatic compounds.

The primary purpose of the present invention is to provide a polymeric composition and methods for use of such compositions for reducing the fluid loss of invert oil emulsion and all oil well drilling and servicing fluids in which oil is the continuous phase, hereinafter sometimes called "oil-base muds" or "oil-base fluids".

In accordance with a first embodiment of the present disclosure, an oil soluble polymer is dissolved in an oil to provide a concentrate which is added to an oil base mud to decrease the fluid loss thereof.

Still another embodiment of the invention provides an additive to reduce the fluid loss of an oil base mud which comprises an oil soluble polymer and an organophilic polyphenolic fluid loss control agent solublized in an oil to form a concentrate.

Another embodiment of the invention provides a method of decreasing the fluid loss of an oil base well drilling or servicing fluid which comprises adding to the fluid a first concentrate comprising an oil soluble polymer dissolved in an oil and a second concentrate comprising an organophilic polyphenolic material dispersed or solublized in an oil.

In another embodiment of the invention, a method of reducing the loss of fluid from an oil base mud is provided which comprises adding a solublized (dissolved) polymer concentrate to an oil base mud.

Yet another embodiment of the invention is to provide a method of preparing a concentrate for reducing the fluid loss of an oil base well drilling or servicing fluid which comprises mixing an oil soluble polymer and an organophilic polyphenolic material in an oil at a temperature in the range from about 150° F. to about 200° F. for 30 minutes to about 3 hours at a mixing shear rate of at least about 5,000 rpm.

In yet another embodiment of the invention, a method of decreasing the fluid loss of an oil base well drilling or servicing fluid is provided which comprises adding to the fluid a first concentrate of an oil soluble polymer dissolved in an oil as provided hereinbefore and a second concentrate or an organophilic polyphenolic material, dissolved or dispersed in an oil. The concentration of the organophilic polyphenolic material in the second concentrate is from about 0.167 grams per milliliter to about 0.348 grams per milliliter of the oil. This second concentrate is prepared by mixing the organophilic polyphenolic material and the oil together at a temperature in the range from about 150° F. to about 200° F. for 30 minutes to about 3 hours.

In a specific aspect of embodiments of the invention, a butadiene-styrene copolymer is dissolved in a paraffinic hydrocarbon oil to form a concentrate which is added to an oil base mud to decrease the fluid loss thereof.

In another embodiment of the invention, a butadiene-styrene copolymer is dissolved in an oil and an organophilic polyphenolic material, such as lignite, is dissolved or dispersed in the oil to form a concentrate which can be added to an oil base mud to decrease the fluid loss therefrom.

In yet another embodiment of the present invention, methods of reducing lost circulation in a subterranean well are described, the method comprising the steps of preparing a treating composition comprising an oleaginous base fluid, a polymer material having a solubility in the oleaginous base fluid, and one or more organophilic polyphenolic materials, the polymer being present in a concentration ranging from about 0.03 g/mL of the base fluid to about 0.143 g/mL of the base fluid; injecting the treating composition into the well; and forcing the treating composition into a lost circulation zone within the well. In accordance with aspects of this embodiment, the oleaginous base fluid is a hydrocarbon fluid with a low- or no aromatic content selected from the group consisting of crude oil, diesel oil, kerosene, mineral oil, parrafinic hydrocarbon fluid, gasoline, naphtha, and mixtures thereof.

DETAILED DESCRIPTION

The written description of specific structures and functions below are not presented to limit the scope of what Applicants have invented or the scope of the appended claims. Rather, the written description is provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Further, it will be understood that the compositions described herein can comprise, consist essentially of, or consist of the stated materials. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

As used herein, the term "well" includes at least one wellbore. A "well" can include a near-wellbore region of a subterranean formation surrounding a portion of a wellbore that is in fluid communication with the wellbore. As used herein, the term "into a well" means at least through the wellhead; it can include into any downhole portion of the wellbore or through the wellbore and into a near-wellbore region.

As used herein, the term "polymer block" means and includes a grouping of multiple monomer units of a single type (i.e., a homopolymer block) or multiple types (i.e., a copolymer block) of constitutional units into a continuous polymer chain of some length that forms part of a larger polymer of an even greater length and exhibits a $_xN$ value with other polymer blocks of unlike monomer types that is sufficient for phase separation to occur. For example, the $_xN$ value of one polymer block with at least one other polymer blocks in the larger polymer may be greater than about 10.

As used herein, the term "block copolymer" means and includes a polymer composed of chains where each chain contains two or more polymer blocks as defined above and at least two of the blocks are of sufficient segregation strength (e.g., $_xN>10$) for those blocks to phase separate. A wide variety of block polymers are contemplated herein, including but not limited to diblock copolymers (i.e., polymers including two polymer blocks), triblock copolymers (i.e., polymers including three polymer blocks), multiblock copolymers (i.e., polymers including more than three polymer blocks), and combinations thereof.

The term "saturated hydrocarbon", as used herein, refers to paraffinic and naphthenic compounds, but not to aromatics. Paraffinic compounds may be either linear (n-paraffins) or branched (i-paraffins). Naphthenic compounds are cyclic saturated hydrocarbons, i.e. cycloparaffins. Such hydrocarbons with cyclic structure are typically derived from cyclopentane or cyclohexane. A naphthenic compound may comprise a single ring structure.

The phrase "high molecular weight hydrocarbons," in accordance with the present invention, refers to those hydrocarbons having an API value (API gravity) of from 8 to 12° API (and generally a viscosity higher than 350 cSt at about 7° C.), while medium molecular weight hydrocarbons have an API value of greater than 20° API (for example, from 22 to 30). The terms "high molecular weight hydrocarbon" and "medium molecular weight hydrocarbon," as used herein, are terms relative to one another. The former term signifies a mixture of hydrocarbons, with or without their entrained impurities, with an average molecular weight of the hydrocarbons significantly higher than the average molecular weight of the hydrocarbons in a medium molecular weight hydrocarbon. Thus, the use of the terms "high molecular weight hydrocarbon" and "medium molecular weight hydrocarbon" does not signify any particular molecular weight ranges.

High molecular weight hydrocarbons are typically materials, such as crude oils, asphaltenes, tars, and heavy oils, which have limited or no practical use, but which can be converted to more valuable and useful lower molecular weight hydrocarbons via chemical means. Medium oils generally have resins or polar fractions less than about 25% of the weight of the total oil and have an API gravity of 22.3 to 32 with viscosities in the range of about 100 to 1000 centipoise; heavy oils generally have resins or polar fractions between about 25 and 40% of the total weight of the oil and have an API gravity of generally above 10 but less than 22.3 with viscosities greater than about 1000 centipoise; tars generally have resins or polar fractions greater than about 40% of the total weight of the oil and have an API gravity less than about 8 to 10 and a viscosity greater than about 8000 centipoise.

The lowest molecular weight hydrocarbons can include $C_1$ to $C_4$ gases, e.g., methane, propane, and natural gas. When these gases are present as part of the lower molecular weight hydrocarbon product, they impart an even higher API value.

Applicants have created compositions and associated methods for utilizing an oil soluble polymer in decreasing the fluid loss of oil base muds, particularly such muds containing oils containing low (or no) aromatic compounds. As used herein, the term "fluid loss" refers to the undesirable migration or loss of fluids (such as the fluid portion of a drilling mud or cement slurry) into a subterranean formation or proppant pack. The term "proppant pack", as used herein, refers to a collection of a mass of proppant particulates within a fracture or open space in a subterranean formation. Fluid loss may be problematic in any number of subterranean operations, including drilling operations, fracturing operations, well bore clean-out operations, and similar treatment operations. In fracturing treatments, for example, fluid loss into the formation may result in a reduction in fluid efficiency, such that the fracturing fluid cannot propagate the fracture as desired.

Oil soluble, polymeric, fluid loss control additives are extremely difficult to dissolve in a low aromatic content hydrocarbon oil. This results in: (1) poor efficiency as a filtration control additive without extensive mixing at elevated temperatures (such as "hot rolling" in a laboratory "roller oven"); (2) extreme viscosity increase of the mud after the polymer is solublized during circulation of the mud; (3) loss of a considerable quantity of the polymer over solids control screening equipment due to the particle size of the undissolved polymer; (4) high concentrations of polymer are required to compensate for the inefficiency and losses of the polymer; and (5) potential formation damage due to the stickiness and adhesive characteristics of partially dissolved polymer lodging in producing formation pore openings as a result of inadequate filtration control.

The concentrate composition of the present invention for reducing the loss of fluid from an oil base mud comprises an oil soluble polymer dissolved in a paraffinic oil. The concentration of polymer in the concentrate is such that the concentrate is flowable and pumpable at ambient temperature, preferably from about 0.03 grams per milliliter of the oil to about 0.143 grams per milliliter of the oil. It is preferred that the Brookfield 8.48 sec$^1$ shear rate viscosity of a 6.15% wt./vol. concentrate at 40 rpm using a number 2 spindle is from about 300 to about 500 centipoise.

The preferred oil soluble polymeric fluid loss control additive for use in the invention comprise styrene-butadiene copolymers known in the art as SBR (styrene-butadiene rubber). The styrene content of the SBR is preferably from about 15% by weight to about 45% by weight of the SBR, more preferably from about 20% to 35% by weight, and most preferably from about 20% to about 25% by weight of the SBR.

It is known to prepare SBR by emulsion polymerization using either a "hot process" or a "cold process." The hot process is conducted at a temperature of about 50° C. whereas the polymerization in a cold process is about 15° C. to about 20° C. The cold process results in a SBR which contains less branching than in the hot process, i.e., the SBR molecules from 10 the cold process contain more linear molecules than the SBR from the hot process. It is preferred that the SBR be prepared using a cold process. It is also preferred that the SBR not be crosslinked.

The SBR for use in the compositions of this invention must be of the crumb type (as it is coagulated from the master batch) rather than a ground, fine particle size material, in order to obtain the desired effect. The particle size of the crumb SBR is less than about 2000 micrometers (microns), U.S. Standard Sieve Series (10 mesh screen), preferably from about 2000 micrometers to about 500 micrometers (35 mesh screen), and more preferably from about 2000 micrometers to about 300 micrometers (50 mesh screen).

Representative crumb type SBR copolymers can be obtained from ISP ELASTOMERS, 1615 Main Street, Port Neches, Tex. 77651 such as the following: Hot Process SBR Elastomers—1006, 1012, and 1013; Cold Process SBR Elastomers—8113 and 4503. It is preferred that the Massed Mooney Viscosity (MML 1+4 (100° C.)) ("Mooney viscosity") of the SBR (as determined by the American Society of Testing Materials standard procedure ASTM D1646-96a) be in the range from about 40 to about 140, most preferably from about 105 to about 135. Some other properties of the crumb SBR include the following: a free flowing crumb form which eliminates the need for milling, cutting or grinding; and the crumb particles retain the porous nature of the coagulated rubber and can be dissolved in a solvent faster than milled or pelletized bale rubber.

Other oil soluble polymers for use in this invention include, but are not limited to, polystyrene, polybutadiene, polyethylene, polypropylene, and copolymers consisting of at least two monomers selected from the group consisting of styrene, butadiene, isoprene, ethene and derivatives thereof, and propylene.

The oil used in the solublized polymer concentrate is preferably an aromatic-free, preferably hydrogenated paraffinic hydrocarbon oil, or synthetic oil that is aromatic-free. Hydrogenation converts the unsaturated, olefinic carbon-to-carbon bonds to saturated, paraffinic bonds. This results in an oil which is more environmentally acceptable. By aromatic-free is meant herein that the oil contains less than 1 volume % aromatic compounds, preferably less than about 0.1 volume %, most preferably no aromatic compounds.

Representative hydrogenated paraffinic oils can be obtained from VASSA, Acientes y Solventes, Venezolanos, S. A., Av. Francisco de Miranda, con calle San Ignacio, Tone 15 Metalica, Piso 3, Chacas, Caracas, Venezuela, such as VASSA™ LP-70, VASSA™ LP-70P, VASSA™ LP-90, VASSA™ LP-100, and VASSA™ LP-120.

The solublized polymer concentrate is prepared by mixing the crumb polymer and oil together at a temperature in the range from about 65° C. to about 93.3° C. for 30 minutes to about 3 hours at a mixing shear rate of at least about 5,000 rpm. A longer mixing time and a higher temperature can be utilized but are generally unnecessary to thoroughly solubilize the polymer. The shear rate during mixing must be sufficient to minimize the adherence of the particulate polymer crumbs to one another and to the sides of the mixing container as the SBR is very adhesive.

The solublized polymer concentrate may be used to decrease the fluid loss of oil base well drilling and servicing fluids. Thus, a method of reducing the fluid loss of an oil base mud comprises adding to the mud the solublized polymer concentrate in an amount sufficient to provide the fluid with from about 0.5 ppb to about 5 ppb of the polymer.

The oil base mud generally comprises the oil, a suspending agent, and a weighting agent, and optionally a dispersed (emulsified) aqueous phase, emulsifiers, wetting agents, dispersants, and the like as is well known in the art.

Oils suitable for use in the oil base muds of this invention may be selected from any known oleaginous liquids having a high flash point such as mineral oil, diesel oil, other petroleum fractions, synthetic esters, synthetic ethers, synthetic hydrocarbons such as internal olefins, polyalphaolefins, and the like. Preferred are environmentally acceptable oils with low toxicity, preferably aromatic-free oils. Particularly preferred are the hydrogenated paraffinic hydrocarbons as set forth hereinbefore.

The emulsifiers used in this invention may be the same emulsifiers generally used in water-in-oil invert drilling fluids. These include the various fatty acid soaps, including oxidized tall oil soaps, preferably the calcium soaps whether pre-formed or prepared in-situ in the fluid, polyamides, alkylamidoamines, imidazolines, alkyl sulfonates, fatty acyl esters, lecithin, and the like. These include so-called primary emulsifiers, and secondary emulsifiers.

See, for example the following U.S. Pat. Nos. 2,876,197; 2,994,660; 2,962,881; 2,816,973; 2,793,996; 2,588,808; 3,244,638; 4,504,276; 4,509,950; 4,776,966; and 4,374,737. Weighting agents as is known in the art can be incorporated in the fluids of this invention. Exemplary weighting agents or weight materials include barite, galena, ilmenite, iron oxide, siderite, calcite, and the like.

Any of the typically used suspending agents known in the industry can be used. The preferred suspending agent is an organophilic clay (organoclay). Exemplary organoclays are set forth in the following U.S. patents, all incorporated herein by reference: U.S. Pat. Nos. 2,531,427; 2,966,506; 4,105,578; 4,208,218. U.S. Pat. No. 5,021,170 discloses mixtures of an organoclay and a sulfonated ethylene/propylene/5-phenyl-2-norborene terpolymer. Preferred organoclays are dimethyldi(alkyl)-ammonium bentonite, dimethyldi(alkyl)-ammonium hectorite, methyl-benzyldi(alkyl) ammonium hectorite, and mixtures thereof.

Any of the typically used fluid loss control additives known in the industry can be present in the oil base mud, such as gilsonite, asphalt, oxidized asphalt, lignites, and the like. Exemplary organophilic polyphenolic materials suitable for use as fluid loss control additives are lignites, as described herein. Particularly preferred are polyphenolic compounds such as humic acid and the alkali metal salts thereof (such as found in lignites). Humic acid (HA) is a material of wide distribution and is present in soils, peat, and coals, particularly lignite or brown coal, and most particularly in the soft brown coal known as a leonardite. Humic acids are complex organic molecules that are formed by the breakdown of organic matter. Their exact structures are generally unknown, and they are extremely variable, often being a mixture of different acids containing carboxyl and phenolate groups (such as quinones, phenols, catechols, and the like) so that the mixture behaves functionally as a dibasic or tribasic add. The principal organic groups present are phenolic and carboxylic OH, aliphatic CH, carbonyl, conjugated carbonyl or aromatic $CH_2$ or $CH_3$ or ionic carboxyl, and possibly others. The average molecular weight of the humic acids is between 5,000 and 50,000.

In accordance with one exemplary embodiment of the present disclosure, the organophilic polyphenolic material is a lignite (amine-treated or otherwise) that exhibits a humic acid (HA) content (as determined by gravimetric analysis or the equivalent), % HA, ranging from about 20% to about 50%±2% HA; greater than 50% d.b. volatile matter as determined by ASTM D3176-09 and D3180; and an average ash content of 15% to 20% d.b. ash (avg.), as determined by ASTM D-3174-12. These requirements have been found to contribute to both the solubility of the polyphenolic material, and the fluid loss control properties.

Various other known additives may also be employed in the fluids of this invention, if necessary or desired. For example, other wetting agents, corrosion inhibitors, scale inhibitors, and other common additives.

The invention further provides a second polymer concentrate to reduce the fluid loss of oil base muds. This second concentrate comprises an oil, an oil soluble polymer, and an organophilic polyphenolic material in which the oil soluble polymer is solublized (dissolved) and in which the organophilic polyphenolic material is dispersed and/or solubilized.

The concentration of the polymer and the organophilic polyphenolic material in this concentrate are such that the concentrate is flowable and pumpable at ambient temperatures. Preferably the concentration of the oil soluble polymer is from about 0.0168 grams per milliliter of the oil to about 0.0348 grams per milliliter of the oil, and the concentration of the organophilic polyphenolic material is from about 0.1677 grams per milliliter of the oil to about 0.3482 grams per milliliter of the oil.

The second polymer concentrate is prepared by mixing the oil soluble polymer, organophilic polyphenolic material, and oil together under the same temperature and time conditions as set forth hereinbefore for the first polymer concentrate. The oil and oil soluble polymer are the same as set forth hereinbefore for use in the first polymer concentrate. The organophilic polyphenolic materials for use in the second polymer concentrate any number of polyphenolic materials, including those known in the art as set forth in the following U.S. patents, each incorporated herein by reference as appropriate: U.S. Pat. No. 3,168,475 (Jordan, et al.); U.S. Pat. No. 3,379,650 (Beasley, et al.); U.S. Pat. No. 3,494,865 (Andrews, et al.); U.S. Pat. No. 4,421,655 (Cowan); U.S. Pat. No. 4,597,878 (House, et al.,); and U.S. Pat. No. 4,853,465 (Cowan, et al.). In accordance with one aspect of the present disclosure, the preferred organophilic polyphenolic materials are organophilic lignitic and amine treated organophilic lignitic (lignite) materials, and amine treated organophilic tannins, the polyphenolic materials being treated with amines, particularly quaternary amines, to make the material oil dispersible in oil- and synthetic-base muds and fluids.

The second polymer concentrate may also be used to decrease the fluid loss of oil base well drilling and servicing fluids. This method of reducing the fluid loss of oil base well drilling and servicing fluids comprises adding to the fluid, or to the oil used in preparing the fluid, the second polymer concentrate in an amount sufficient to provide the fluid with from about 0.5 ppb to about 2.5 ppb of the polymer, and from about 5 ppb to about 25 ppb of the organophilic polyphenolic material.

The invention further provides a concentrate of an organophilic polyphenolic material dissolved and/or dispersed in an oil for the addition to oil base fluids containing the solublized polymer concentrate of this invention. When added to oil base fluids containing the pre-solublized polymer concentrate, the concentrate of the organophilic polyphenolic material reduces the large viscosity increase (>25%) upon aging the fluids at elevated temperatures as compared when adding the organophilic polyphenolic material as manufactured, i.e., as a dry powder. The concentration of the organophilic polyphenolic material in this concentrate is from about 0.1677 grams per milliliter to about 0.3482 grams per milliliter of the oil. This concentrate is prepared by mixing the oil and the organophilic polyphenolic material together at a temperature in the range from about 150° F. to about 200° F. for 30 minutes to about 3 hours.

The invert fluids of the invention generally will have an oil to water (O/W or oil:water) volume ratio of from about 40:60 to about 95:5. The "all oil" fluids of the invention will contain less than about 5 volume % aqueous phase, preferably less than about 2 volume %.

The compositions of the present disclosure are useful in preventing fluid loss in certain subterranean formations, during a number of different subterranean operations, including drilling, completion, and workover. "Drilling" refers to the events and equipment necessary for drilling a wellbore. "Completion" refers to the events and equipment necessary to bring a wellbore into production once drilling operations have been concluded, including but not limited to the assembly of downhole tubulars and equipment required to enable safe and efficient production from an oil or gas well. "Workover" refers to the performance of major maintenance or remedial treatments on an oil or gas well.

Completion and workover operations may include, but are not limited to, cementing, gravel packing, stimulation, and conformance operations. Many of these well services are designed to facilitate or enhance the production of desirable fluids from or through a subterranean formation.

As used herein, the word "treatment" refers to a treatment for a well or subterranean formation penetrated by a wellbore that is adapted to achieve a specific purpose in completion or workover, such as stimulation, isolation, or conformance control; however, the word "treatment" does not necessarily imply any particular purpose.

Drilling typically requires the use of a drilling fluid. As used herein, a "drilling fluid" is any of a number of fluids, including fluid mixtures of a liquid with particulate solids or gas (such as suspensions, emulsions, foams) used in operations to drill boreholes into the earth. The term is synonymous with "drilling mud" in general usage, although sometimes the term is used to refer to more sophisticated and well-defined "muds." One classification scheme for drilling fluids is based on singling out the component that clearly defines the function and performance of the fluid: (1) water-based, (2) non-water-based, and (3) gaseous (pneumatic). Each category has a variety of subcategories that overlap each other considerably.

A treatment typically involves introducing a treatment fluid into a well. As used herein, a "treatment fluid" is a fluid used to resolve a specific condition of a wellbore or subterranean formation. As used herein, a "treatment fluid" also means the specific composition of a fluid at the time the fluid is being introduced into a wellbore. A treatment fluid is typically adapted to be used to achieve a specific purpose, such as stimulation, isolation, or control of reservoir gas or water. The word "treatment" in the term "treatment fluid" does not necessarily imply any particular action by the fluid.

A "spacer fluid" is a fluid used to physically separate one special-purpose fluid from another. A special-purpose fluid can be a drilling fluid, a cementing fluid, or a treatment fluid. Special-purpose fluids are typically prone to contamination, so a spacer fluid compatible with each is used between the two. For example, a spacer fluid is used when changing fluid types used in a well. For example, a spacer fluid is used to change from a drilling fluid during drilling a well to a cement slurry during cementing operations in the well. In case of an oil-based drilling fluid, it should be kept separate from a water-based cementing fluid. In changing to the latter operation, a chemically treated water-based spacer fluid is usually used to separate the drilling fluid from the cement slurry. By way of another example, a spacer fluid can be used to separate two different types of treatment fluids.

As used herein, a "well fluid" refers to any fluid adapted to be used in a well for a particular purpose, without necessarily implying any particular purpose. A "well fluid" can be, for example, a drilling fluid, a cementing fluid, a treatment fluid, or a spacer fluid. As used herein, a "well fluid" means the specific composition of a fluid at the time the fluid is being introduced into a wellbore.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

In these examples and this specification, the following abbreviations may be used: API=American Petroleum Institute; bbl=42 gallon barrel; ppg=pounds per gallon; gal=gallon; $m^3$=cubic meters; ° F.=degrees Fahrenheit; %=percent; $kg/m^3$=kilograms per cubic meter; PV=API plastic viscosity in centipoise (cp); YP=API yield point, measured in pounds per 100 square feet (lb/100 $ft^2$); 10"/10' Gels=10 second/10 minute gel strengths in pounds per 100 square feet; LSRV=Brookfield low shear rate viscosity at 0.3 revolutions per minute, 0.063 $sec^{-1}$ in centipoise; vol.=volume; O/W=oil/water ratio, vol/vol; mL=milliliters; g=grams; lb=pounds; cp=centipoise; ft=feet; rpm=revolutions per minute; ES=emulsion stability, in volts; psi=pounds per square inch; mm=millimeter; HTHP=high temperature, high pressure fluid loss, measured at 200-350° F./500 psi differential and reported as milliliters (mL)/30 min, evaluated in accordance with API Bulletin RP 13B-2 1990 or the equivalent (e.g., API Recommended Practice (RP) 131/26.4—"Procedure for High Temperature, High Pressure (HTHP) Filtration").

The plastic viscosity, yield point, and gel strengths were obtained by the procedures set forth in API's Recommended Practice 13B-1. Using the viscometer as described in API Bulletin RP 13B-1, the viscosity of the fluids was determined by taking readings at 600 rpm, 300 rpm, 200 rpm, 100 rpm, 6 rpm, and 3 rpm. The following calculations were made to determine the Plastic Viscosity (PV) and Yield Point (YP): Plastic Viscosity=600 rpm reading minus 300 rpm reading=PV value (in cP); Yield Point=300 rpm reading minus PV=YP value (in lb/100 $ft^2$). Gel strength readings were taken at 10 second, 10 minute, and 30 minute intervals in the following manner: the viscometer was run at high speed for 10 seconds and then the fluid remains static (undisturbed) for 10 seconds. At the end of 10 seconds, the maximum reading running the viscometer at 3 rpm was recorded. This procedure was repeated for 10 minute and 30 minute gels, the values being given in units of lb/100 $ft^2$. The LSRV (low shear rate viscosity) was obtained for the fluids using a Brookfield Model LVTDV-I viscometer having a number 2 or 3 spindle at 0.3 revolutions per minute (shear rate of 0.063 $sec^{-1}$). The LSRV is indicative of the suspension properties of the fluid, the larger the LSRV, the better is the suspension of solids in the fluid. The fluid loss was determined at 300° F. in a modified API HTHP cell at 500 psi differential pressure utilizing a 3 micron disk (Aloxite™)

In the examples, the oil designated "LP-90E" is the hydrogenated paraffinic hydrocarbon VASSA™ LP-90 containing 1.56 mL per bbl of the organoclay activator set forth in U.S. Pat. No. 7,897,544 (Dobson, et al.), incorporated herein by reference, wherein the volume ratio of propylene carbonate to tall oil fatty acid is 1:4. The oil designated "SAFRASOL D 80™" is a dearomatized kerosene available from Safra Co. Ltd., P.O. Box 2824, Jeddah 21461, Saudi Arabia. The hydrocarbon polymers utilized in the examples designated "SBR 1012", "SBR 8113", "SBR 1013", "SBR 1006", and "SBR 4503" are crumb-type styrene-butadiene rubber copolymers available from ISP Elastomers, 1615 Main Street, Port Neches, Tex. 77651. The organophilic polyphenolic material is the organophilic lignite "Petrolig™" available from Grinding and Sizing Co., Inc., 7707 Wallisville Road, Houston, Tex. 77020, which is lignite from Texas. The lignite preferably exhibits a humic acid (HA) content (as determined by gravimetric analysis or the equivalent), % HA, ranging from about 20% to about 50%±2% HA; greater than 50% d.b. volatile matter as determined by ASTM D3176-09 and D3180; and an average ash content of 15% to 20% d.b. ash (avg.), as determined by ASTM D-3174-12.

EXAMPLES

Example 1

Sample Preparation

To 0.6354 bbl equivalents (222.4 milliliters or 189.2 grams) of VASSA™ LP-90 were added 1.0 mL of propylene carbonate, 5.75 grams of the organoclay CLAYTONE® IMG 400 (a product of Southern Clay Products, Gonzales, Tex.), 0.1 mL of a secondary emulsifier, 30 mL of a polymer concentrate containing 0.035 grams per milliliter of <8 mesh SBR 8113 crumb and 0.4 grams per milliliter of PETROLIG™ solublized and dispersed in VASSA™ LP-90 oil (mixed 2 hr. at 175° F.), 40 grams of ULTRA CARB 12 calcium carbonate bridging agent available from TBC-Brinadd, Houston, Tex., and 352 grams of barite. The oil base mud was mixed with a Brookfield overhead mixer at 5200 rpm for 40 total minutes. The oil base mud was then evaluated for rheological properties and fluid loss properties as set forth in Table 1.

The polymer concentrate (350 mL) was prepared as follows: (1) Heat 210.3 mL of VASSA™ LP-90 oil to 175° F. (79.4° C.) while mixing slowly on a Fann™ overhead mixer; (2) Add 140 grams of PETROLIG™ and allow to disperse completely (about 30 seconds at 5200 rpm); (3) With the Fann™ overhead mixer at medium/low speed add 12.25 grams of SBR 8113 crumb (<8 mesh); (4) Continue mixing for 2 hours at 175° F., increasing the speed of the mixer as the SBR dissolves and the concentrate thickens.

Example 2

An oil base mud such as described in Example 1 was prepared, except that the fluid contained 187.4 mL of VASSA™ LP-90, and the 30 mL of the polymer concentrate used in Example 1 was replaced by 33.6 mL of a concentrate containing 125 grams of PETROLIG™ (114 mL) dissolved/dispersed in 236 mL VASSA™ LP-90, and 20 mL of a concentrate containing 5% wt./vol. (0.05 grams/mL) SBR 8113 in VASSA™ LP-90 oil. The data obtained is given in Table 2.

Comparative Example A

An oil base mud such as described in Example 1 was prepared, except that the fluid contained 213.5 mL of VASSA™ LP-90, and the 30 mL of the polymer concentrate used in Example 1 was replaced by 21.0 mL of the 5% wt./vol. SBR 8113 crumb concentrate in Example 2 and 12.0 grams of PETROLIG™ powder. The data obtained is given in Table A.

The data in Table 1 and Table 2 as compared to the data in Table A indicates that the polymer concentrate containing both the solublized SBR 8113 crumb copolymer and the solublized/dispersed organolignite (Table 1) or the two concentrates containing the solublized polymer and the solublized/dispersed organolignite (Table 2) produced oil base muds exhibiting better fluid loss control and better rheological stability after heating at 300° F. as compared to adding the dry, powdered organolignite, as exhibited by the HTHP/API fluid loss values of 20 and 22 respectively for the two solubilized compositions, compared with the HTHP/API fluid loss value of nearly 32 when the organophilic polyphenolic material was added in dry, powdered form (i.e., dry blended). This data also shows that the solubilized polymer and solubilized or dispersed organophilic polyphenolic material in combination perform efficiently as fluid loss control additives for well treatment or drilling fluids.

Example 3

To 213.5 mL of SAFRASOL D80™ were added 1.0 mL of the organoclay activator set forth in U.S. Pat. No. 7,897,544 (Dobson et al.), 5.75 grams of the organoclay CLAYTONE® IMG 400, 33.0 mL of the polymer concentrate containing 5.0% wt./vol. SBR 8113 crumb and 36.0% wt./vol. PETROLIG™ solubilized and dispersed in SAFRASOL D80™ (mixed at 175° F. for 2 hrs.), 40.0 grams of ULTRA CARB 12, 353 grams of barite, and 0.1 mL of a secondary emulsifier. The oil base mud was mixed as in Example 1 and evaluated. The data obtained is set forth in Table 3.

Comparative Example B

To 0.61 bbl equivalents (213.5 mL) of VASSA™ LP-90 oil are added 1.0 mL of propylene carbonate, 5.75 grams of the organoclay CLAYTONE® IMG 400, 0.1 mL of a secondary emulsifier, 12.0 grams of PETROLIG™, 21 mL of a polymer concentrate containing 5% wt/vol SBR 1012 crumb (1.05 grams SBR 1012), 40 grams of ULTRA CARB 12, and 352 grams of barite to prepare one bbl equivalent (350 mL) of an oil base fluid of this invention. The fluid was admixed for 30 minutes with an overhead mixer. The oil base fluid was then evaluated for rheological properties and fluid loss properties as set forth in Table B.

Comparative Examples C, D

Comparative Example B was repeated except that the SBR 1012 was replaced by SBR 1013, and SBR 1006, respectively. The data obtained is set forth in Tables C, and D, respectively. The data in Tables B, C, and D, indicate the large viscosity increase of the oil base fluids containing the dry organophilic polyphenolic material (lignite powder) upon aging at high temperatures, and in comparison with the data in Comparative Example A, that the cold processed SBR crumb (SBR 8113) is preferred over the hot processed SBR crumb (SBR 1012, 1013, 1006).

TABLE 1

|  | Initial | Initial | After Hot Rolling 16 hr. @ 300° F. |
|---|---|---|---|
| Temperature, ° F. | 79 | 150 | 150 |
| API Rheology |  |  |  |
| 600 | 185 | 98 | 84 |
| 300 | 108 | 58 | 52 |
| 200 | 80 | 45 | 40 |
| 100 | 49 | 30 | 27 |
| 6 | 14 | 12 | 11 |
| 3 | 12 | 11 | 9 |
| PV | 77 | 40 | 32 |
| YP | 31 | 18 | 20 |
| 10"/10' Gels | 20/37 | 18/36 | 14/26 |
| LSRV |  |  |  |
| Peak | 65,300 | 53,200 | 54,600 |
| 2 Minute | 65,300 | 53,200 | 53,300 |
| HTHP Fluid Loss @ 300° F. |  |  |  |
| Spurt, mL |  | 1.0 | Trace |
| 30 Minute, mL |  | 9.0 | 22.0 |

TABLE 2

|  | Initial | Initial | After Hot Rolling 16 hr. @ 300° F. |
|---|---|---|---|
| Temperature, ° F. | 83 | 150 | 150 |
| API Rheology |  |  |  |
| 600 | 210 | 104 | 90 |
| 300 | 124 | 64 | 53 |
| 200 | 93 | 49 | 40 |
| 100 | 58 | 33 | 26 |
| 6 | 15 | 13 | 10 |
| 3 | 11 | 11 | 9 |
| PV | 86 | 40 | 37 |
| YP | 38 | 24 | 16 |
| 10"/10' Gels | 17/40 | 18/45 | 14/26 |
| LSRV |  |  |  |
| Peak | 97,000 | 60,000 | 55,700 |
| 2 Minute | 97,000 | 60,000 | 55,700 |
| HTHP Fluid Loss @ 300° F. |  |  |  |
| Spurt, mL |  |  | Trace |
| 30 Minute, mL |  |  | 20.0 |

TABLE A

|  | Initial | Initial | After Hot Rolling 16 hr. @ 300° F. |
|---|---|---|---|
| Temperature, ° F. | 82 | 150 | 150 |
| API Rheology |  |  |  |
| 600 | 128 | 74 | 132 |
| 300 | 72 | 42 | 96 |
| 200 | 51 | 32 | 85 |
| 100 | 31 | 21 | 70 |
| 6 | 7 | 7 | 56 |
| 3 | 5 | 5 | 55 |
| PV | 56 | 32 | 36 |
| YP | 16 | 10 | 60 |
| 10"/10' Gels | 8/16 | 9/20 | 72/85 |
| LSRV |  |  |  |
| Peak | 36,200 | 27,800 | 89,000 |
| 2 Minute | 36,200 | 27,800 | 66,700 |
| HTHP Fluid Loss @ 300° F. |  |  |  |
| Spurt, mL |  | 1.5 | 4.0 |
| 30 Minute, mL |  | 13.0 | 31.5 |

TABLE 3

|  | Initial | After Hot Rolling 16 hr. @ 300° F. |
|---|---|---|
| Temperature, ° F. | 85 | 150 |
| API Rheology |  |  |
| 600 | 120 | 98 |
| 300 | 70 | 68 |
| 200 | 52 | 59 |
| 100 | 32 | 48 |
| 6 | 8 | 35 |
| 3 | 6 | 35 |
| PV | 50 | 30 |
| YP | 20 | 38 |
| 10"/10' Gels | 10/26 | 45/65 |
| LSRV |  |  |
| 2 Minute | 51,100 | 62,900 |
| HTHP Fluid Loss @ 300° F. |  |  |
| Spurt, mL | 0 | Trace |
| 30 Minute, mL | 5.0 | 8.0 |

TABLE B

SBR 1012

|  | Initial | Initial | After Hot Rolling 16 hr. @ 300° F. |
|---|---|---|---|
| Temperature, ° F. | 82 | 150 | 150 |
| API Rheology |  |  |  |
| 600 | 138 | 78 | 171 |
| 300 | 78 | 47 | 130 |
| 200 | 58 | 35 | 120 |
| 100 | 35 | 23 | 94 |
| 6 | 8 | 8 | 74 |
| 3 | 6 | 7 | 73 |
| PV | 50 | 47 | 41 |
| YP | 28 | 31 | 87 |
| 10"/10' Gels | 10/20 | 10/22 | 88/110 |
| LSRV |  |  |  |
| Peak | 51,800 | 45,200 | 108,000 |
| 2 Minute | 51,800 | 45,200 | 91,200 |
| HTHP Fluid Loss @ 300° F. |  |  |  |
| Spurt, mL |  | Trace | Trace |
| 30 Minute, mL |  | 13.5 | 16.5 |

TABLE C

SBR 1013

|  | Initial | Initial | After Hot Rolling 16 hr. @ 300° F. |
|---|---|---|---|
| Temperature, ° F. | 82 | 150 | 150 |
| API Rheology |  |  |  |
| 600 | 130 | 70 | 153 |
| 300 | 72 | 40 | 113 |
| 200 | 52 | 30 | 103 |
| 100 | 30 | 18 | 86 |
| 6 | 7 | 5 | 70 |
| 3 | 5 | 4 | 70 |
| PV | 58 | 30 | 40 |
| YP | 14 | 10 | 73 |
| 10"/10' Gels | 8/20 | 7/16 | 91/95 |
| LSRV |  |  |  |
| Peak | 47,300 | 38,400 | 259,000 |
| 2 Minute | 47,300 | 38,400 | 74,000 |

TABLE C-continued

SBR 1013

|  | Initial | Initial | After Hot Rolling 16 hr. @ 300° F. |
|---|---|---|---|
| HTHP Fluid Loss @ 300° F. |  |  |  |
| Spurt, mL |  | Trace | 1.0 |
| 30 Minute, mL |  | 11.5 | 26.0 |

TABLE D

SBR 1006

|  | Initial | Initial | After Hot Rolling 16 hr. @ 300° F. |
|---|---|---|---|
| Temperature, ° F. | 82 | 150 | 150 |
| API Rheology |  |  |  |
| 600 | 115 | 66 | 184 |
| 300 | 64 | 38 | 130 |
| 200 | 46 | 28 | 125 |
| 100 | 28 | 18 | 115 |
| 6 | 6 | 5 | 91 |
| 3 | 4 | 4 | 91 |
| PV | 51 | 28 | 54 |
| YP | 13 | 10 | 76 |
| 10"/10' Gels | 8/19 | 7/15 | 105/112 |
| LSRV |  |  |  |
| Peak | 41,000 | 27,300 | 83,000 |
| 2 Minute | 41,000 | 27,300 | 54,800 |
| HTHP Fluid Loss @ 300° F. |  |  |  |
| Spurt, mL |  | Trace | 1.0 |
| 30 Minute, mL |  | 12.5 | 29.5 |

Other and further embodiments utilizing one or more aspects of the inventions described above can be devised without departing from the spirit of Applicant's invention. For example, other, equivalent polymers not listed herein, or co-polymers of such polyphenolic materials, may be used in the compositions without deviating from the scope of this disclosure. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of reducing fluid loss in a well, the method comprising:
    providing a fluid loss prevention concentrate comprising:
        an oleaginous liquid;
        a soluble polymer selected from styrene-butadiene rubber (SBR) crumb and a styrene-butadiene-styrene block copolymer crumb; and
        an amine-treated lignite,
    preparing a treating fluid by dispersing or dissolving the fluid loss prevention concentrate within an oil-based drilling fluid so that the concentration of the soluble polymer in the treating fluid is 0.5 ppb to 5 ppb,
    injecting the treating into the well, and
    circulating the treating fluid into a lost circulation zone of the well so as to form a filter cake comprising the SBR crumb within the lost circulation zone.

2. The method of claim 1, wherein the polymer is a cold-type SBR crumb.

3. The method of claim 1, wherein the oleaginous liquid is an aromatic-free, hydrogenated oil consisting essentially of saturated hydrocarbons of medium- to high-molecular weight.

4. The method of claim 1, wherein the concentration of the polymer is from about 0.0168 grams per milliliter (g/mL) of the oleaginous liquid to about 0.05 g/mL of the oleaginous liquid.

5. The method of claim 1, wherein the concentration of the amine-treated lignite is from about 0.1677 g/mL of the oleaginous liquid to about 0.3482 g/mL of the oleaginous liquid.

* * * * *